United States Patent
Hsu et al.

(10) Patent No.: US 9,684,336 B2
(45) Date of Patent: Jun. 20, 2017

(54) MECHANISM DEVICE WITH ROTARY HOLDER AND DISPLAY DEVICE THEREWITH

(71) Applicant: Wistron Corporation, New Taipei (TW)

(72) Inventors: Chun-Peng Hsu, New Taipei (TW); Chin-Hsien Chen, New Taipei (TW); Wen-Chin Wu, New Taipei (TW); Chien Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 33 days.

(21) Appl. No.: 14/583,827

(22) Filed: Dec. 29, 2014

(65) Prior Publication Data

US 2016/0062399 A1   Mar. 3, 2016

(30) Foreign Application Priority Data

Aug. 27, 2014 (TW) .............................. 103129578 A

(51) Int. Cl.
*G06F 1/16* (2006.01)

(52) U.S. Cl.
CPC .......... *G06F 1/1632* (2013.01); *G06F 1/1601* (2013.01)

(58) Field of Classification Search
CPC .... G06F 1/1632; G06F 1/1654; G06F 1/1626; G06F 1/1601; G06F 1/1607;
(Continued)

(56) References Cited

U.S. PATENT DOCUMENTS 5,692,400 A * 12/1997 Bliven ................ E05B 73/0005
                                                        361/679.43
6,702,604 B1 * 3/2004 Moscovitch ........ B60R 11/0235
                                                            248/121
(Continued)

FOREIGN PATENT DOCUMENTS

TW          M241709         8/2004
TW          M258325         3/2005
(Continued)

OTHER PUBLICATIONS

Office action mailed on Sep. 10, 2015 for the Taiwan application No. 103129578, filing date: Aug. 27, 2014, p. 2 line 6-26, p. 3 and p. 4 line 1-3.
(Continued)

*Primary Examiner* — Courtney Smith
*Assistant Examiner* — Sagar Shrestha
(74) *Attorney, Agent, or Firm* — Winston Hsu

(57) ABSTRACT

A mechanism device includes a hinge mechanism, a holding base, a guiding member and a fixing member. The holding base is pivoted to the frame by the hinge mechanism and includes a main casing, a first holding casing and a second holding casing. The first holding casing and the second holding casing extend from two opposite sides of the main casing along a direction away from the hinge mechanism, such that the main casing, the first holding casing and the second holding casing cooperatively define a holding slot with openings formed on two sides thereof, so as to hold an electronic device. The guiding member is disposed within the holding slot and for guiding the electronic device into the holding slot. The fixing member is disposed within the holding slot and for fixing the electronic device inside the holding slot after the electronic device enters the holding slot.

13 Claims, 15 Drawing Sheets

(58) Field of Classification Search
CPC ............... H05K 5/0221; H05K 5/0226; H04N 2201/0058; H01R 2201/06
USPC ................ 361/679.02, 679.21, 679.22, 361/679.41–679.44, 679.55–679.6; 710/303, 304; 312/223.1, 223.2
See application file for complete search history.

(56) References Cited

U.S. PATENT DOCUMENTS

| | | | | |
|---|---|---|---|---|
| 8,395,887 | B2* | 3/2013 | Zhang | H01R 13/443 361/679.01 |
| 9,047,051 | B2 | 6/2015 | Yu | |
| 9,331,444 | B2* | 5/2016 | Carnevali | H01R 31/06 |
| 2004/0203267 | A1* | 10/2004 | Chen | F16M 13/00 439/76.1 |
| 2004/0246666 | A1* | 12/2004 | Maskatia | G06F 1/1616 361/679.57 |
| 2008/0232061 | A1* | 9/2008 | Wang | G06F 1/1632 361/679.41 |
| 2010/0129140 | A1* | 5/2010 | Lyon | F16L 25/08 403/24 |
| 2012/0037771 | A1* | 2/2012 | Kitchen | G06F 1/1632 248/223.41 |
| 2012/0057278 | A1* | 3/2012 | Fu | F16M 11/105 361/679.01 |
| 2013/0155583 | A1* | 6/2013 | Yang | G06F 1/1626 361/679.01 |
| 2014/0037372 | A1 | 2/2014 | Chang | |
| 2014/0133080 | A1* | 5/2014 | Hwang | G06F 1/1632 361/679.17 |
| 2015/0036139 | A1* | 2/2015 | Hsu | G06F 1/1632 356/402 |
| 2015/0120980 | A1* | 4/2015 | Kim | G06F 1/1632 710/303 |
| 2015/0153772 | A1* | 6/2015 | Chang | G06F 1/1632 361/679.09 |
| 2015/0205330 | A1* | 7/2015 | Zhang | G06F 1/1626 361/679.3 |
| 2015/0244126 | A1* | 8/2015 | Carnevali | G06F 1/1628 439/527 |
| 2015/0277499 | A1* | 10/2015 | MacDonald | G06F 1/1679 361/679.09 |

FOREIGN PATENT DOCUMENTS

| | | |
|---|---|---|
| TW | M305093 | 1/2007 |
| TW | I326401 | 6/2010 |
| TW | I360734 | 3/2012 |
| TW | 201407313 | 2/2014 |
| TW | 201426247 | 7/2014 |

OTHER PUBLICATIONS

Office action mailed/issued on Feb. 27, 2017 for CN application No. 201410488523.5, p. 3 line 6-32, p. 4 and p. 5 line 1-20.

* cited by examiner

MECHANISM DEVICE WITH ROTARY HOLDER AND DISPLAY DEVICE THEREWITH

BACKGROUND OF THE INVENTION

1. Field of the Invention

The present invention relates to a mechanism device and a display device, and more particularly, to a mechanism device with capability of guiding electronic devices with different sizes and with clamping stability and a display device therewith.

2. Description of the Prior Art

With development of touch panel industry, a tablet computer has been gradually implemented into people's daily life. A docking device is utilized for coupling the tablet computer to a display device, such that the display device is able to display a working interface on the tablet computer as the tablet computer is in use. However, since the conventional docking device adopts a connector to mate with another connector of the tablet computer, it leads to damage of the connector of the docking device and the connector of the tablet computer duo to improper alignment during the above-mentioned mating process.

SUMMARY OF THE INVENTION

Thus, the present invention provides a mechanism device with capability of guiding electronic devices with different sizes and with clamping stability and a display device therewith for solving above drawbacks.

According to the claimed invention, a mechanism device with rotary holder installed on a frame includes a hinge mechanism, a holding base, at least one guiding member and at least one fixing member. The hinge mechanism is installed on the frame. The holding base is pivoted to the frame by the hinge mechanism and includes a main casing, a first holding casing and a second holding casing. The first holding casing and the second holding casing extend from two opposite sides of the main casing along a direction away from the hinge mechanism, such that the main casing, the first holding casing and the second holding casing cooperatively define a clamping slot with openings formed on two sides thereof for holding an electronic device. The at least one guiding member is disposed inside the clamping slot and for guiding the electronic device into the clamping slot. The at least one fixing member is disposed inside the clamping slot and for fixing the electronic device inside the clamping slot when the electronic device enters the clamping slot.

According to the claimed invention, the at least one guiding member is a guiding post disposed through the main casing and diving into the clamping slot, and the guiding post is for inserting into a guiding hole on the electronic device. The hinge mechanism includes a base and a rotating member. The base is fixed on the frame. The rotating member is pivoted to the base, and the guiding post protrudes from the rotating member. The holding base is installed on the rotating member and capable of rotating with the rotating member, wherein two through holes are formed on the main casing for allowing the guiding post to pass through and dive into the clamping slot.

According to the claimed invention, the at least one fixing member is a bushing structure covering the guiding post, and the bushing structure tightly fits a wall surrounding the guiding hole when the guiding post inserts into the guiding hole.

According to the claimed invention, the guiding post has a front end and a rear end, and the guiding post passes through the main casing along a direction from the rear end toward the front end. The bushing structure has a plurality of engaging protrusions, and a cross section of each of the engaging protrusions gradually increases along a direction from the front end toward the rear end.

According to the claimed invention, each of the engaging protrusions is substantially a triangular structure.

According to the claimed invention, the bushing structure is made of rubber material.

According to the claimed invention, the at least one guiding member is a first magnetic member disposed on the first holding casing, and the first magnetic member is for abstracting a second magnetic member of the electronic device, so as to guide the electronic device into the clamping slot.

According to the claimed invention, the at least one fixing member is a pad structure disposed on the second holding casing, and the pad structure presses an upper surface of the electronic device when the first magnetic member guides the electronic device into the clamping slot.

According to the claimed invention, the second holding casing has a front side and a rear side, and the rear side is coupled to the main casing. The pad structure has a plurality of engaging protrusions, and a cross section of each of the engaging protrusions gradually increases along a direction from the front side toward the rear side.

According to the claimed invention, the pad structure is made of rubber material.

According to the claimed invention, the main casing has a fixing rib. The second holding casing is rotably disposed on the main casing and has an abutting rib. The mechanism device further includes a driving member with a fixing end and a free end. The fixing end abuts against the fixing rib and the free end abutting against the abutting rib, such that the driving member drives the second holding casing to rotate toward the first holding casing, so as to make the pad structure press the upper surface of the electronic device.

According to the claimed invention, the mechanism device further includes a rotating arm rotably disposed on the frame. The rotating arm drives the second holding casing to rotate away from the first holding casing when the holding base rotates to a detaching position, so as to activate the pad structure to depart from the upper surface of the electronic device. The rotating arm releases the second holding casing when the holding base rotates to a usage position, such that the driving member drives the second holding casing to rotate toward first holding casing.

According to the claimed invention, the main casing further has a pushing block, and the second holding casing further has a pushed structure. The rotating arm has a pivotal end and an abutting end, and the pivotal end is for pivoting the frame. When the holding base rotates to the detaching position, the pushed structure moves to where the pushed structure abuts against the abutting end and the pushing block pushes the rotating arm, such that the rotating arm activates the abutting end to push the pushed structure, so as to make the second holding casing to rotate away from the first holding casing. When the holding base rotates to the usage position, the pushing block departs from the rotating arm and the abutting end releases the pushed structure, such that the driving member drives the second holding casing to rotate toward the first holding casing.

According to the claimed invention, a length of the guiding member is greater than a width of the second holding casing.

According to the claimed invention, the mechanism device further includes a connector disposed inside the clamping slot and coupled to a display unit installed on the frame. The connector is for coupling the electronic device to the display unit.

According to the claimed invention, a display device includes a frame, a display unit and a mechanism device. The display unit is installed on the frame, and the mechanism device is installed on the frame. The mechanism device includes a hinge mechanism, a holding base, at least one guiding member and at least one fixing member. The hinge mechanism is installed on the frame. The holding base is pivoted to the frame by the hinge mechanism and includes a main casing, a first holding casing and a second holding casing. The first holding casing and the second holding casing extend from two opposite sides of the main casing along a direction away from the hinge mechanism, such that the main casing, the first holding casing and the second holding casing cooperatively define a clamping slot with openings formed on two sides thereof for holding an electronic device. The at least one guiding member is disposed inside the clamping slot and for guiding the electronic device into the clamping slot. The at least one fixing member is disposed inside the clamping slot and for fixing the electronic device inside the clamping slot when the electronic device enters the clamping slot.

In summary, the present invention utilizes the guiding member for properly orienting and guiding the electronic device into the clamping slot on the holding base. In such a manner, the connector of the electronic device is able to be aligned with the connector of the mechanism device properly during the aforesaid process, so as to prevent the connector of the mechanism device and the connector of the electronic device from damage due to improper alignment. Furthermore, when the electronic device is guided into the clamping slot on the holding base, the present invention further utilizes the fixing member to fix the electronic device inside the clamping slot, so as to prevent the electronic device from detaching from the clamping slot. Thus, it further prevents the connectors from improper mating. In addition, since the clamping slot for holding the electronic device has the openings formed on the two sides thereof, the openings on the two sides of the clamping slot do not constrain a width of the electronic device that is held by the clamping slot. In other words, the holding base of the present invention is able to hold electronic devices with different sizes by design of the clamping slot with the openings formed on the two sides thereof.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
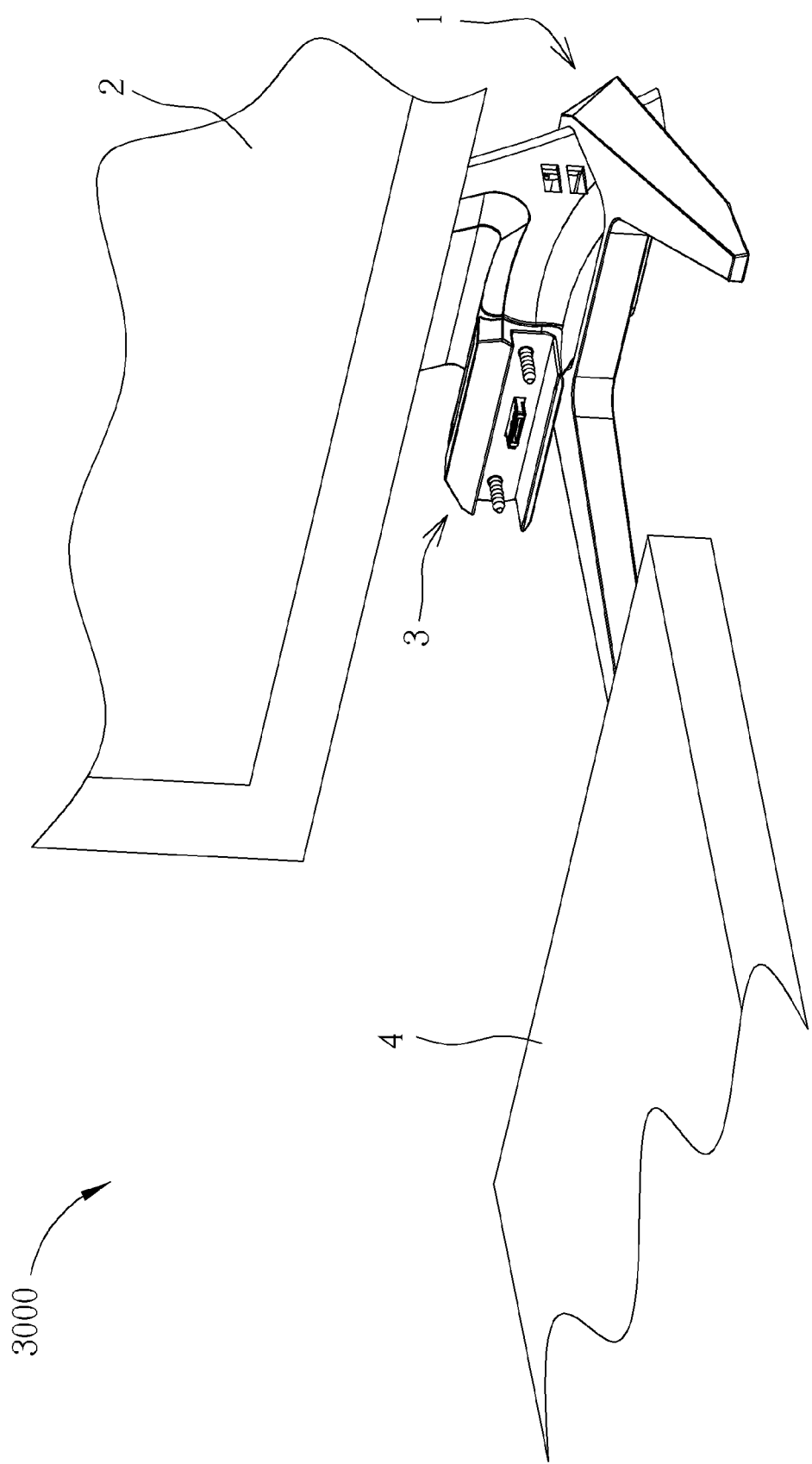
FIG. 1 is a schematic diagram of a display device according to a first embodiment of the present invention.

Please refer to FIG. 1. FIG. 1 is a schematic diagram of a display device 3000 according to a first embodiment of the present invention. As shown in FIG. 1, the display device 3000 includes a frame 1, a display unit 2 and a mechanism device 3. The display unit 2 and the mechanism device 3 are installed on the frame 1. The frame 1 is used for supporting the display unit 2 and the mechanism device 3 on a supporting surface (not shown in figures), such as a desktop, a ground and so on. The mechanism device 3 is used for coupling the display unit 2 to an electronic device 4, such that the display unit 2 displays an interface of the electronic device 4 for allowing the user to deal with the desired affairs executed by the electronic device 4 by utilizing the display unit 2. In this embodiment, the display unit 2 is a liquid crystal display module, such as a liquid crystal monitor, a liquid crystal television and so on, and the electronic device 4 is a portable electronic device, such as a tablet computer and so on.

Figure 2:
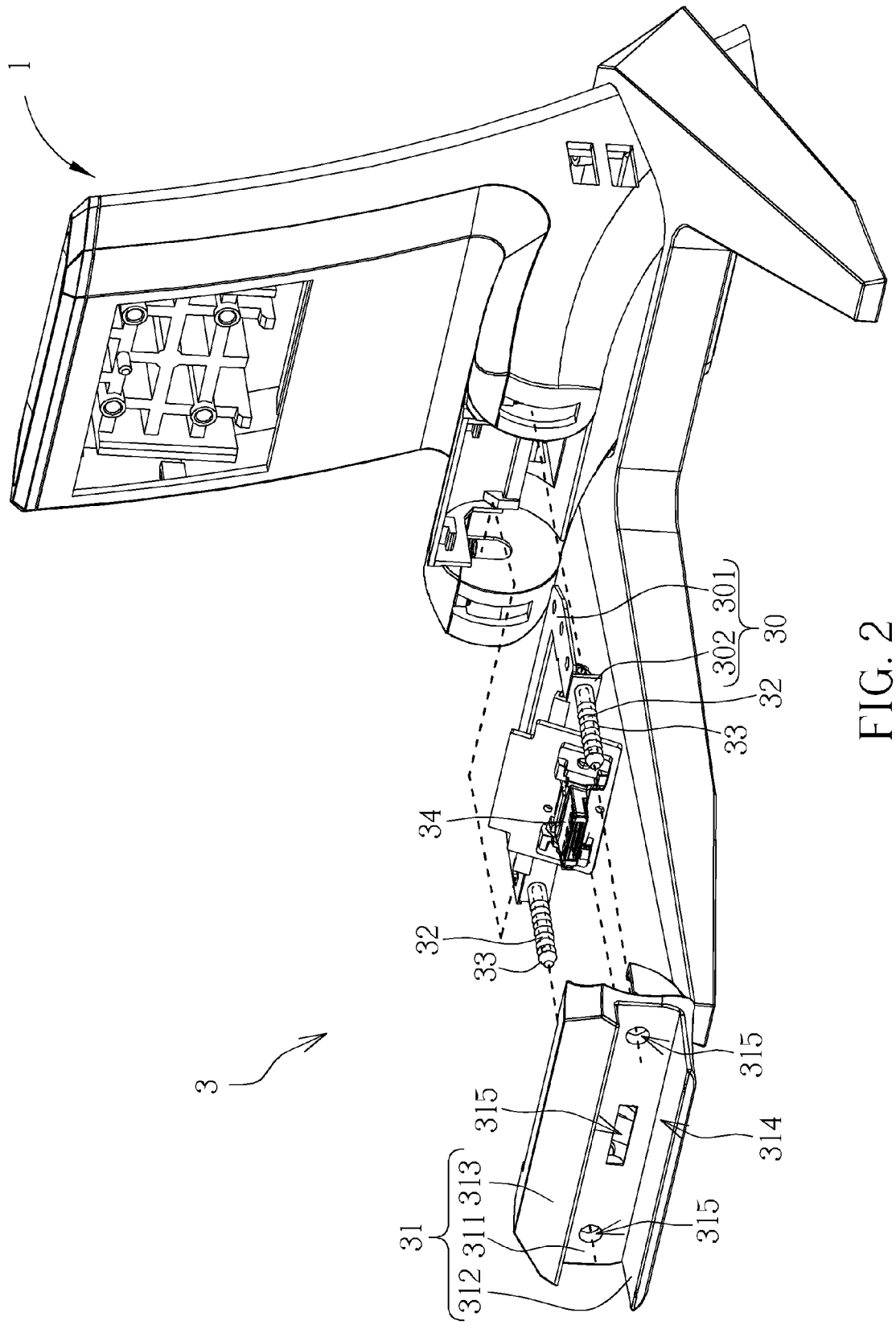
FIG. 2 is an exploded diagram of a frame and a mechanism device according to the first embodiment of the present invention.
Figure 3:
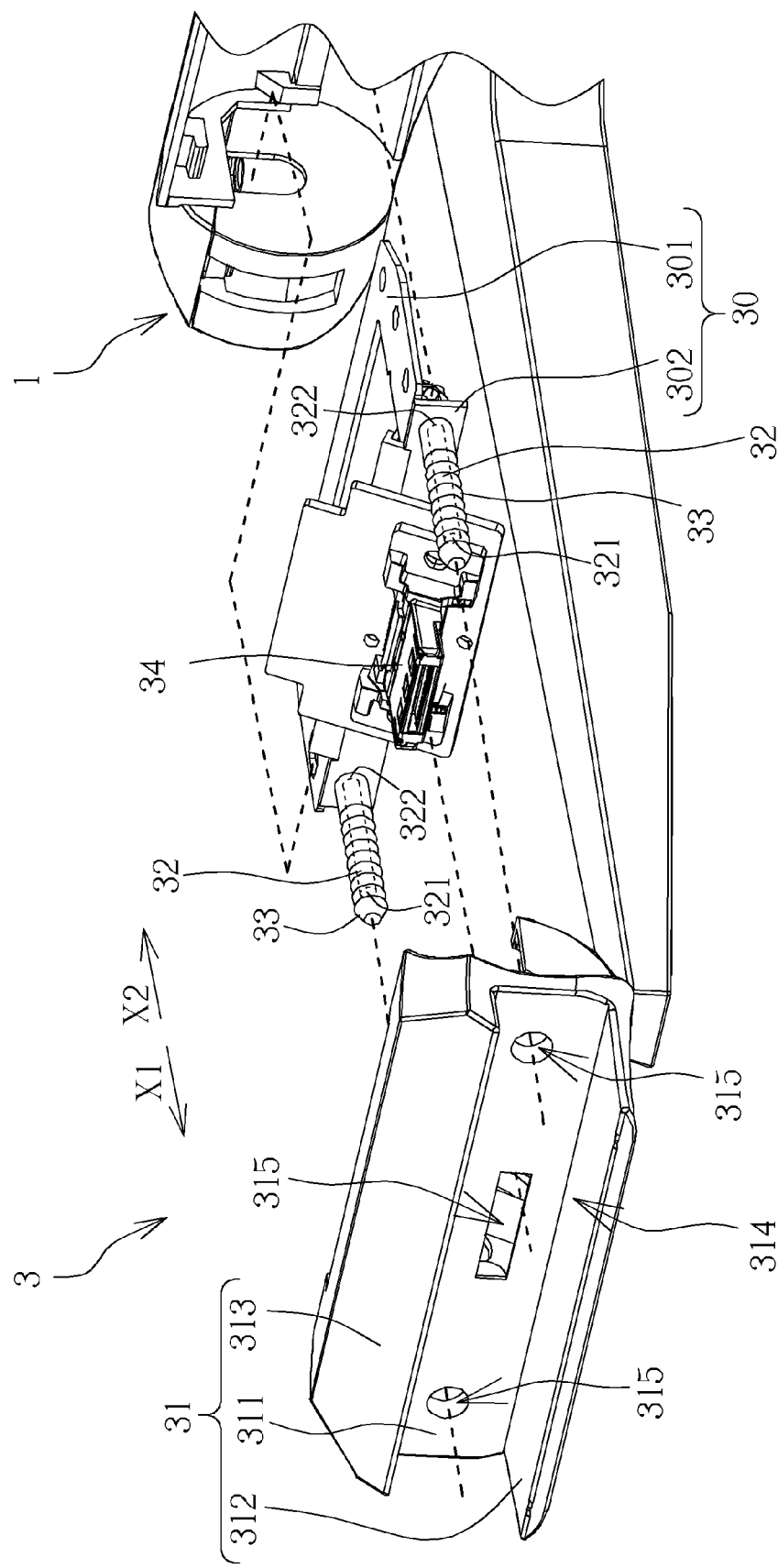
FIG. 3 is a partly exploded diagram of the frame and the mechanism device according to the first embodiment of the present invention.

Please refer to FIG. 1 to FIG. 3. FIG. 2 is an exploded diagram of the frame 1 and the mechanism device 3 according to the first embodiment of the present invention. FIG. 3 is a partly exploded diagram of the frame 1 and the mechanism device 3 according to the first embodiment of the present invention. As shown in FIG. 1 to FIG. 3, the mechanism device 3 includes a hinge mechanism 30, a holding base 31, two guiding members 32, two fixing members 33 and a connector 34. The hinge mechanism 30 is installed on the frame 1. The holding base 31 is pivoted to the frame 1 by the hinge mechanism 30, such that the holding base 31 is able to pivot relative to the frame 1. Furthermore, the holding base 31 includes a main casing 311, a first holding casing 312 and a second holding casing 313. The first holding casing 312 and the second holding casing 313 extend from two opposite sides of the main casing 311 along a direction away from the hinge mechanism 30. Accordingly, the main casing 311, the first holding casing 312 and the second holding casing 313 cooperatively define a clamping slot 314 with openings formed on two sides thereof, such that the holding base 31 holds the electronic device 4 by utilizing the clamping slot 314.

It should be noticed that since the openings are formed on the two sides of the clamping slot 314 on the holding base 31 of the present invention, the openings on the two sides of the clamping slot 314 do not constrain a width of the electronic device 4 that is held by the clamping slot 314. In other words, the holding base 31 of the present invention is able to hold electronic devices with different sizes by design of the clamping slot 314 with the openings formed on the two sides thereof. Furthermore, the two guiding members 32, the two fixing members 33 and the connector 34 are all disposed inside the clamping slot 314, and the connector 34 is coupled to the display unit 2. Those amounts and configuration of the guiding member 32 and the fixing member 33 are not limited to those illustrated in figures in this embodiment. The mechanism device 3 can include one guiding member 32 and one fixing member 33 as well, and it depends on practical demands.

Figure 4:
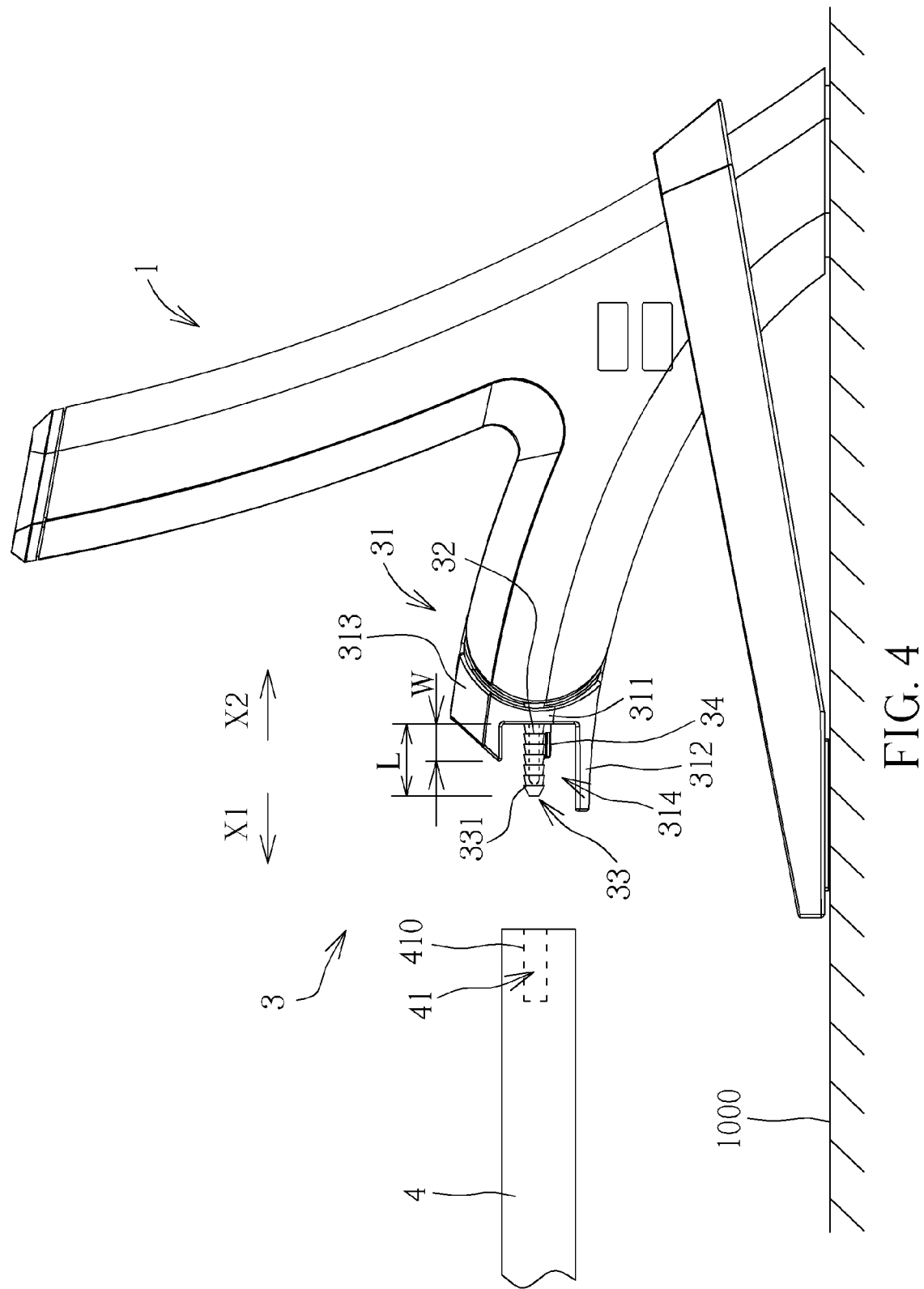
FIG. 4 is a diagram of the frame and the mechanism device in a detaching status according to the first embodiment of the present invention.
Figure 5:
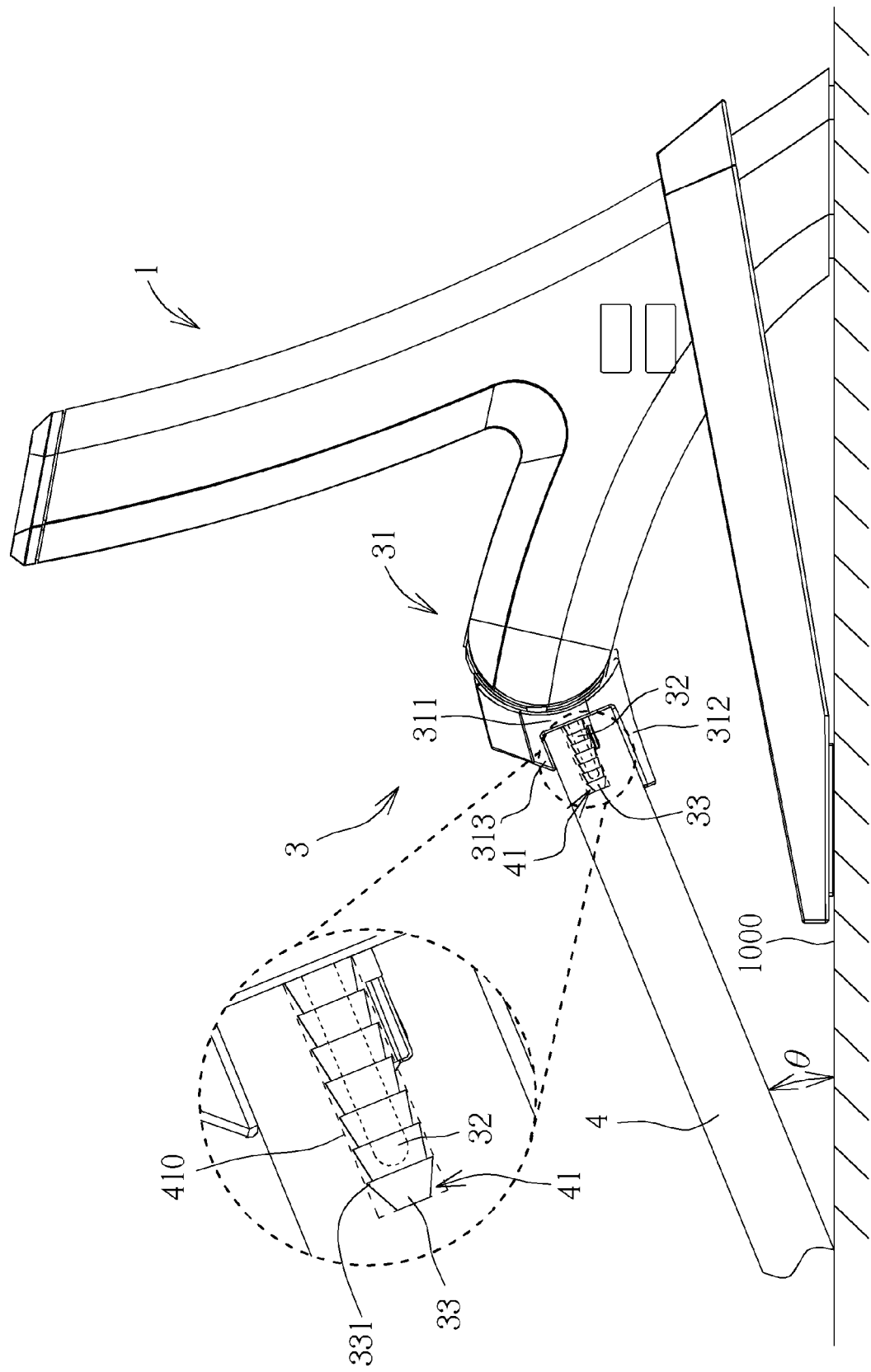
FIG. 5 is a diagram of the frame and the mechanism device in a usage status according to the first embodiment of the present invention.

Please refer to FIG. 3 to FIG. 5. FIG. 4 is a diagram of the frame 1 and the mechanism device 3 in a detaching status according to the first embodiment of the present invention. FIG. 5 is a diagram of the frame 1 and the mechanism device 3 in a usage status according to the first embodiment of the present invention. As shown in FIG. 3 to FIG. 5, the two guiding members 32 are respectively a guiding post, and the two fixing members 33 are respectively a bushing structure covering the guiding post (i.e. the guiding member 32). In this embodiment, the hinge mechanism 30 includes a base 301 and a rotating member 302. The rotating member 302 is pivoted to the base 301, and the base 301 is fixed on the frame 1 for providing foundation that the rotating member 302 is able to pivot relative to the frame 1. The guiding post protrudes from the rotating member 302 and the holding base 31 and the connector 34 are both installed on the rotating member 302. Accordingly, the guiding post, the holding base 31 and the connector 34 are able to be activated to rotate relative to the frame 1 with the rotating member 302 simultaneously. In addition, three through holes 315 are formed on the main casing 311 of the holding base 31, wherein the through holes 315 on two lateral sides of the main casing 311 are circular holes for allowing the guiding posts to pass through and dive into the clamping slot 314; the through hole 315 in the middle of the main casing 311 is a rectangular hole for allowing the connector 34 to pass through and dive into the clamping slot 314.

Furthermore, guiding post (i.e. the guiding member 32) has a front end 321 and a rear end 322. During assembly, the guiding post passes through the main casing 311 along a direction from the rear end 322 toward the front end 321 (i.e. a first direction X1). In addition, the bushing structure (i.e. the fixing member 33) has a plurality of engaging protrusions 331. A cross section of each of the engaging protrusions 331 gradually increases along a direction from the front end 321 toward the rear end 322 (i.e. a second direction X2). In other words, each of the engaging protrusions 331 is substantially a triangular structure, as shown in FIG. 4. In this embodiment, the bushing structure (i.e. the fixing member 33) is made of rubber material (e.g. carbon rubber material).

As shown in FIG. 4 and FIG. 5, when the mechanism device 3 is desired to couple the electronic device 4 to the display unit 2, the electronic device 4 is inserted into the clamping slot 314 on the holding base 31, which is in a detaching position shown in FIG. 4, along the second direction X2. During the aforesaid process, the guiding post (i.e. the guiding member 32) is able to insert into a guiding hole 41 on the electronic device 4, such that the electronic device 4 is guided from a position represented by solid lines to a position represented by dash lines, as shown in FIG. 4. In other words, the guiding member 32 is used for guiding the electronic device 4 to enter the clamping slot 314 by the aforesaid cooperation of the guiding post and the guiding hole 41, such that the holding base 31 is able to hold the electronic device 4.

It should be noticed that a length L of the guiding member 32 can be designed to be greater than a width W of the second holding casing 313 of the holding base 31 for the sake of facilitating the guiding hole 41 on the electronic device 4 to be aligned with the guiding post inside the clamping slot 314. Accordingly, the connector 34 is able to exceed an area covered by the second holding casing 313 for enabling a user to see the front end 321 of the guiding member 32 from a side above holding base 31. It facilitates the guiding hole 41 on the electronic device 4 to be aligned with the guiding post (i.e. the guiding member 32), so as to smoothly guide and properly orient the electronic device 4 into the clamping slot 314. In such a manner, a connector (not shown in figures) of the electronic device 4 is able to be aligned with the connector 34 properly during the aforesaid process, so as to prevent the connector 34 of the mechanism device 3 and the connector of the electronic device 4 from damage due to improper alignment.

Furthermore, since an outer diameter of the bushing structure (i.e. the fixing member 33) is slightly greater than a bore diameter of the guiding hole 41 and the bushing structure is made of flexible material (e.g. the rubber material), the bushing structure (i.e. the fixing member 33) is compressed by a wall 410 surrounding the guiding hole 41 and thus it leads the bushing structure to tightly fit the wall 410 surrounding the guiding hole 41 during the process that the guiding post (i.e. the guiding member 32) inserts into the guiding hole 41. In other words, for the sake of the wall 410 surrounding the guiding hole 41 compressing the bushing structure (i.e. the fixing member 33), the fixing member 33 is able to fix the electronic device 4 inside the clamping slot 314 when the electronic device 4 enters the clamping slot 314, so as to prevent the electronic device 4 from detaching from the clamping slot 314.

In addition, since the cross section of the engaging protrusion 331 of the bushing structure (i.e. the fixing member 33) gradually increases along the direction from the front end 321 toward the rear end 322 (i.e. the second direction X2), i.e. a direction, which the cross section of the engaging protrusion 331 increases, is reverse to a detaching direction that the electronic device 4 detaches from the mechanism device 3 (i.e. the first direction X1). As a result, it facilitates to increase resistance of the guiding hole 41 on the electronic device 4 detaching from the fixing member 33 of the mechanism device 3 that the cross-section increasing direction of the engaging protrusion 331 is reverse to the detaching direction that the electronic device 4 detaches from the mechanism device 3 (i.e. the first direction X1). Accordingly, the fixing member 33 fits the wall 410 surrounding the guiding hole 41 more tightly. As mentioned above, the engaging protrusion 331 with reverse structure of the present invention enables the electronic device 4 to fix inside the clamping slot 314 more stably.

In summary, when the holding base 31 holds the electronic device 4, the weight of the electronic device 4 itself drives the holding base 31 to rotate relative to the frame 1, such that the electronic device 4 and the holding base 31 rotate relative to the frame 1 to a usage position, as shown in FIG. 5. Meanwhile, a side of the electronic device 4 is supported by a supporting surface 1000, such that an angle θ is included between the electronic device 4 and the supporting surface 1000 for adjusting an angle between the electronic device 4 and the user, leading to convenience of operation of the electronic device 4.

Figure 6:
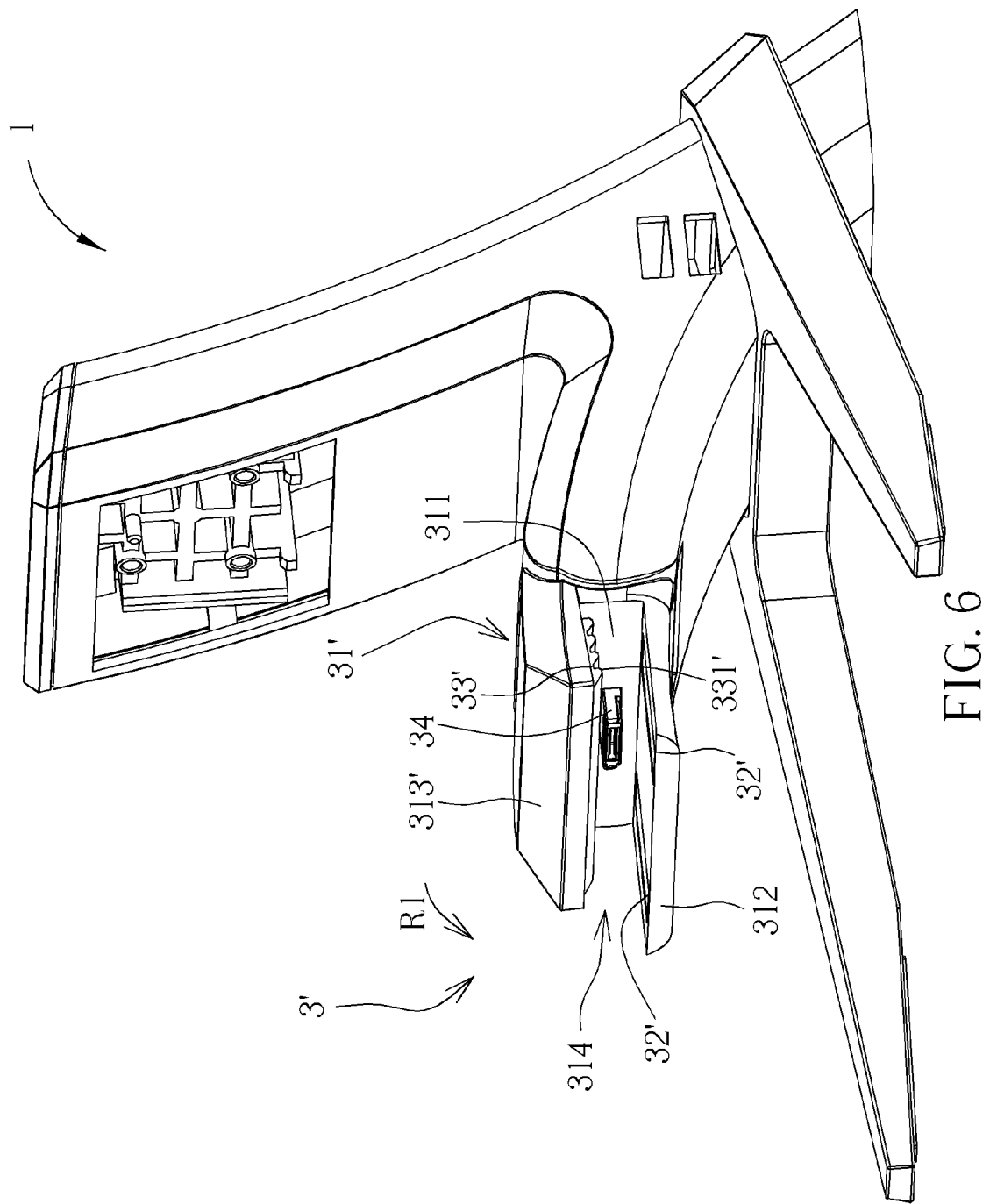
FIG. 6 is an assembly diagram of a mechanism device and the frame according to a second embodiment of the present invention.
Figure 7A:
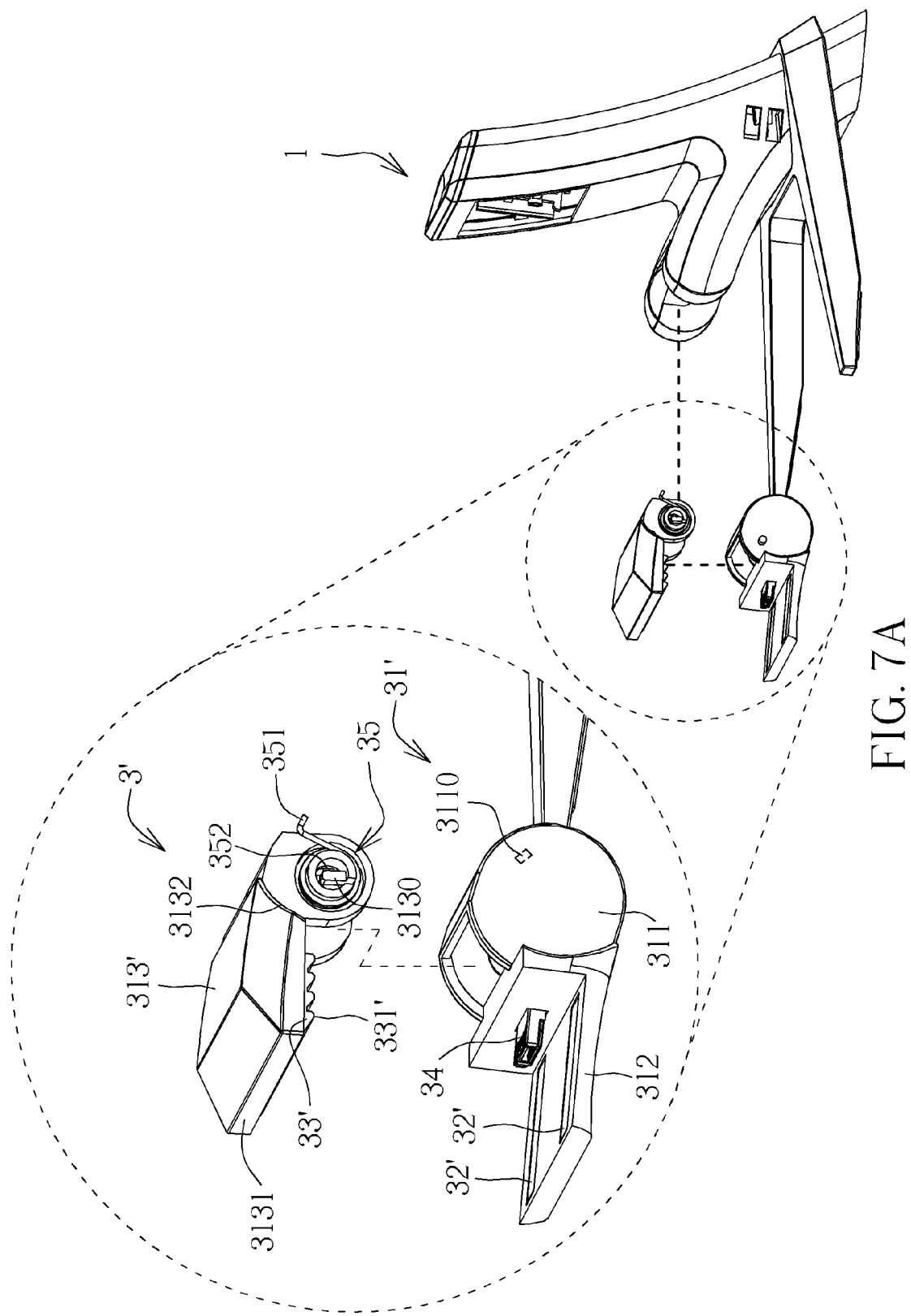
FIG. 7A is an exploded diagram of the mechanism device and the frame according to the second embodiment of the present invention.
Figure 7B:
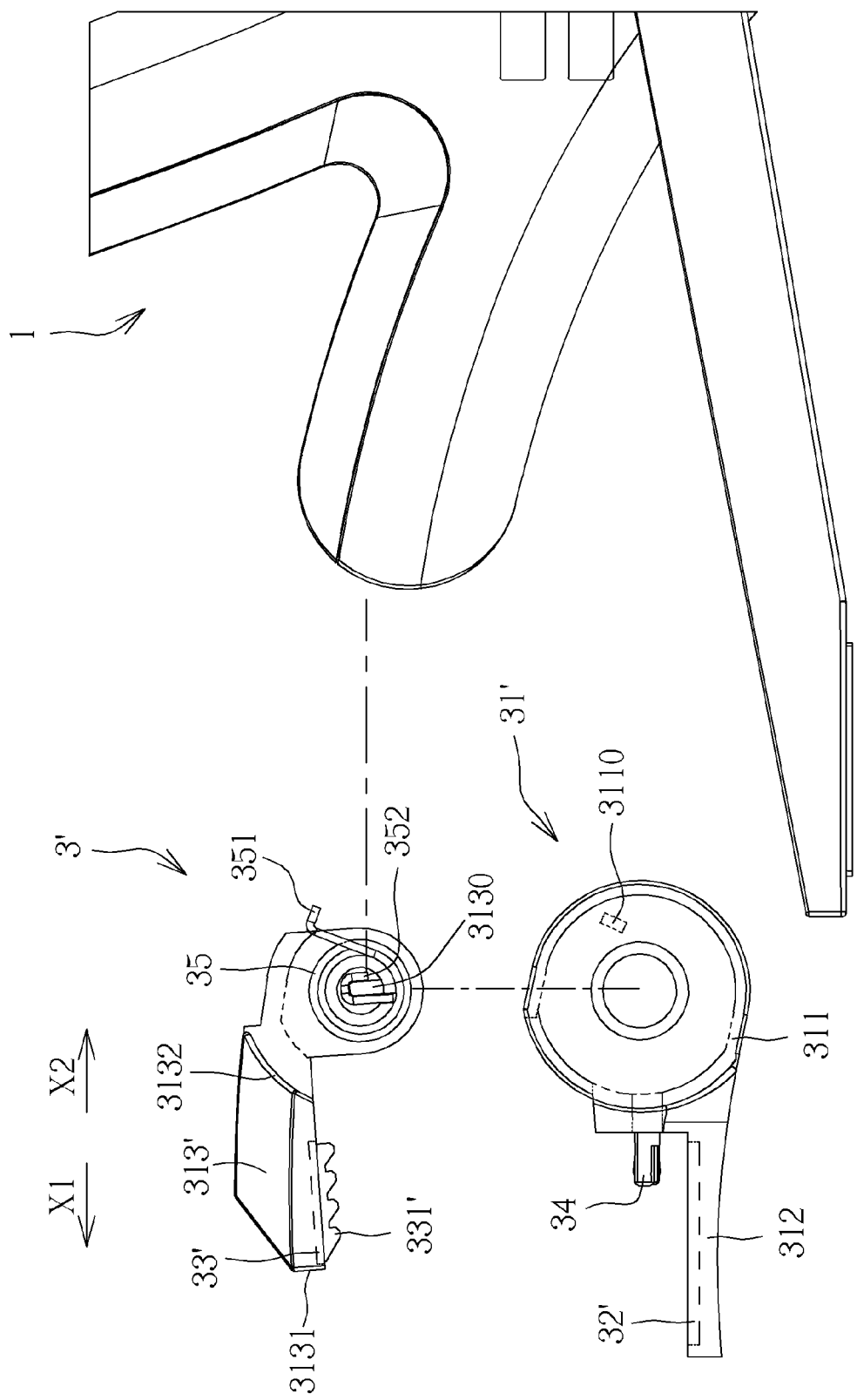
FIG. 7B is a partly exploded perspective diagram of the mechanism device and the frame according to the second embodiment of the present invention.

Please refer to FIG. 6, FIG. 7A and FIG. 7B. FIG. 6 is an assembly diagram of a mechanism device 3' and the frame 1 according to a second embodiment of the present invention. FIG. 7A is an exploded diagram of the mechanism device 3' and the frame 1 according to the second embodiment of the present invention. FIG. 7B is a partly exploded perspective diagram of the mechanism device 3' and the frame 1 according to the second embodiment of the present invention. As shown in FIG. 6, FIG. 7A and FIG. 7B, the main difference between the mechanism device 3' and the aforesaid mechanism device 3 is that a guiding member 32' of the mechanism device 3' is a first magnetic member disposed on the first holding casing 312 of a holding base 31', and a fixing member 33' of the mechanism device 3' is a pad structure disposed on a second holding casing 313' of the holding base 31'. The main casing 311 of the holding base 31' has a fixing rib 3110. The second holding casing 313' is rotably disposed on the main casing 311 and has an abutting rib 3130. The mechanism device 3' further includes a driving member 35. In this embodiment, the driving member 35 is a torsion spring with a fixing end 351 and a free end 352. The fixing end 351 abuts against the fixing rib 3110, and the free end 352 abuts against the abutting rib 3130. Accordingly, the driving member 35 (i.e. the torsion spring) is able to drive the second holding casing 313' to rotate toward the first holding casing 312. In other words, the driving member 35 of the mechanism device 3' is used for driving the second holding casing 313' to rotate along a first rotating direction R1, as shown in FIG. 6.

Figure 8:
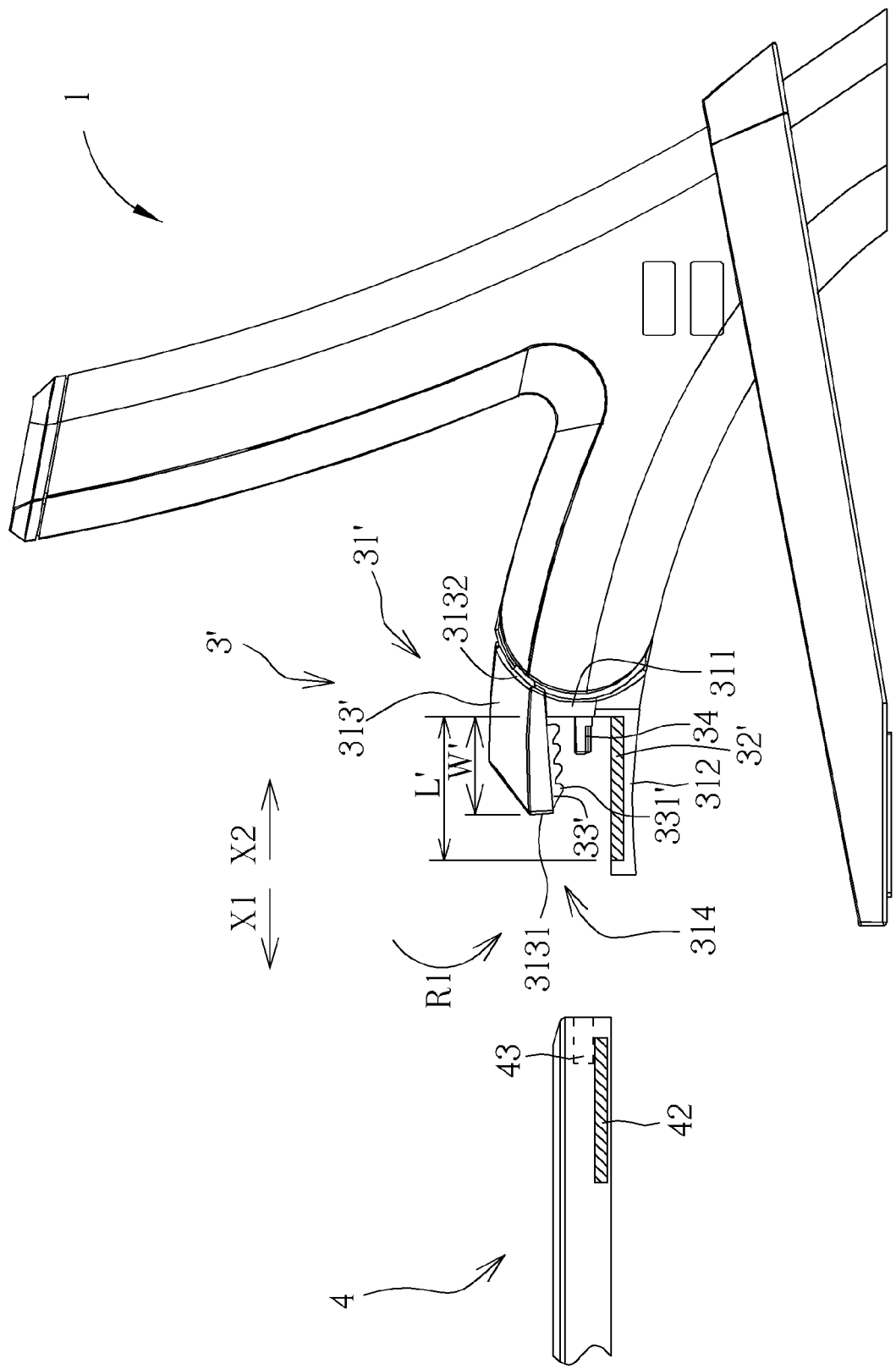
FIG. 8 is a diagram of the mechanism device and the frame in a detaching status according to the second embodiment of the present invention.
Figure 9:
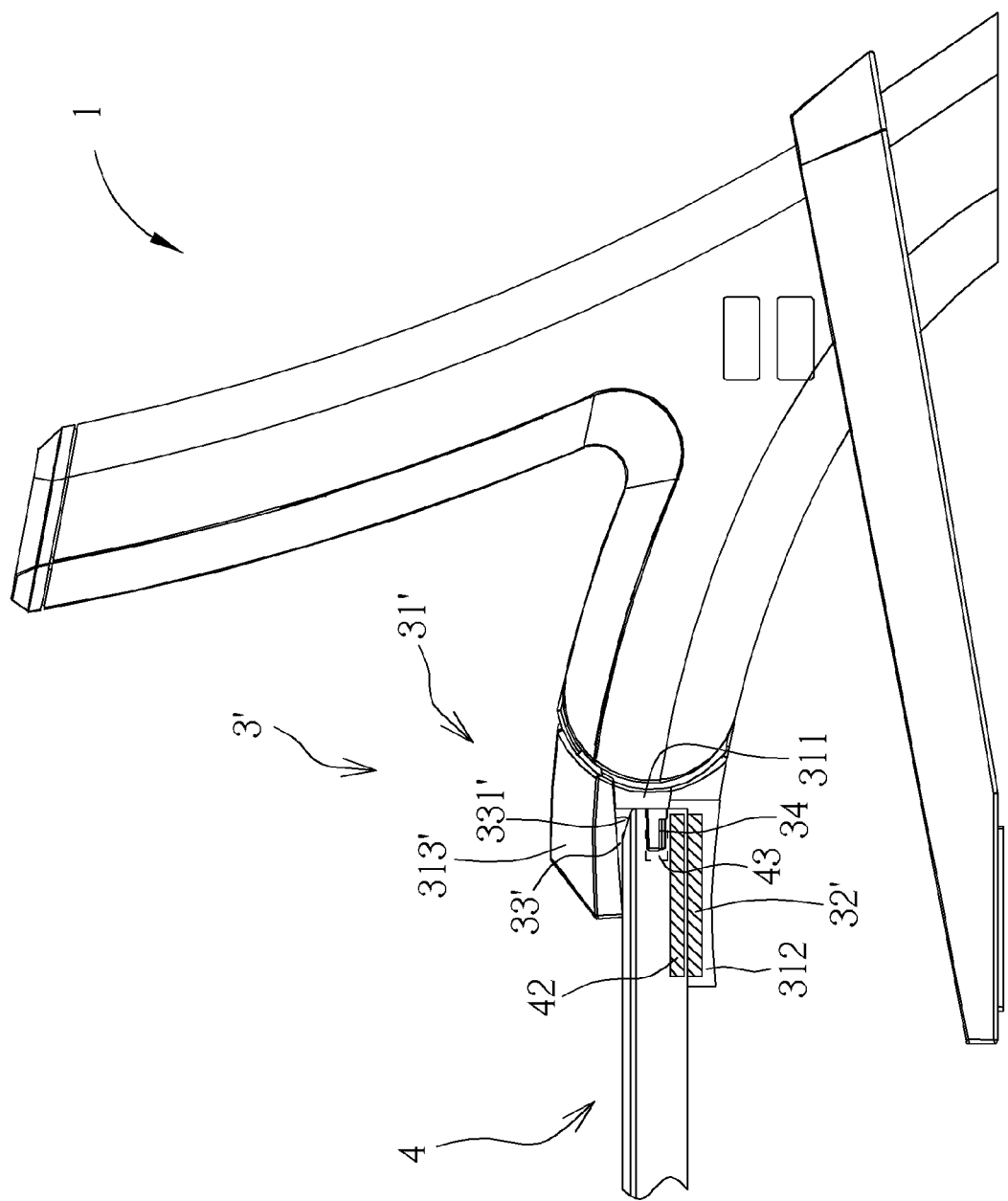
FIG. 9 is a diagram of the mechanism device and the frame in a usage status according to the second embodiment of the present invention.

Please refer to FIG. 7A, FIG. 8 and FIG. 9. FIG. 8 is a diagram of the mechanism device 3' and the frame 1 in a detaching status according to the second embodiment of the present invention. FIG. 9 is a diagram of the mechanism device 3' and the frame 1 in a usage status according to the second embodiment of the present invention. As shown in FIG. 7A, FIG. 8 and FIG. 9, the second holding casing 313' has a front side 3131 and a rear side 3132. The rear side 3132 is coupled to the main casing 311. The pad structure (i.e. the fixing member 33') has a plurality of engaging protrusions 331'. A cross section of each of the engaging protrusions 331' gradually increases along a direction from the front side 3131 toward the rear side 3132 (i.e. the second direction X2). In other words, each of the engaging protrusions 331' is substantially a triangular structure, as shown in FIG. 8. In this embodiment, the pad structure (i.e. the fixing member 33') is made of rubber material (e.g. the carbon rubber material).

As shown in FIG. 8 and FIG. 9, when the mechanism device 3' is desired to couple the electronic device 4 to the display unit 2, the electronic device 4 is inserted into the clamping slot 314 on the holding base 31' in a detaching position, as shown in FIG. 8, along the second direction X2. During the aforesaid process, the first magnetic member (i.e. the guiding member 32') is able to abstract a second magnetic member 42 of the electronic device 4, such that the electronic device 4 is guided from a position shown in FIG. 8 to a position shown in FIG. 9. In other words, the guiding member 32' is used for guiding the electronic device 4 to enter the clamping slot 314 by the aforesaid cooperation of the first magnetic member (i.e. the guiding member 32') and the second magnetic member 42, such that the holding base 31' is able to hold the electronic device 4.

It should be noticed that a length L' of the guiding member 32' can be designed to be greater than a width W' of the second holding casing 313' of the holding base 31' for the sake of facilitating the electronic device 4 to be aligned with the first magnetic member inside the clamping slot 314. Accordingly, the guiding member 32' is able to exceed an area covered by the second holding casing 313' for enabling a user to see the guiding member 32' from a side above the holding base 31'. It facilitates the electronic device 4 to be aligned with the first magnetic member (i.e. the guiding member 32'), so as to smoothly guide and properly orient the electronic device 4 into the clamping slot 314. In such a manner, a connector 43 of the electronic device 4 is able to be aligned with the connector 34 properly during the aforesaid process, so as to prevent the connector 34 of the mechanism device 3' and the connector 43 of the electronic device 4 from damage due to improper alignment.

Furthermore, since the pad structure (i.e. the fixing member 33') is made of rubber material, the driving member 35 drives the second holding casing 313' to rotate along the first rotating direction R1 to press the upper surface of the electronic device 4. It leads the pad structure to resiliently abut against the electronic device 4 when the electronic device 4 is guided into the clamping slot 314. In other words, for the sake of the pad structure (i.e. the fixing member 33') resiliently abutting against the electronic device 4, the fixing member 33' is able to fix the electronic device 4 inside the clamping slot 314 when the electronic device 4 enters the clamping slot 314, so as to prevent the electronic device 4 from detaching from the clamping slot 314.

Figure 10A:
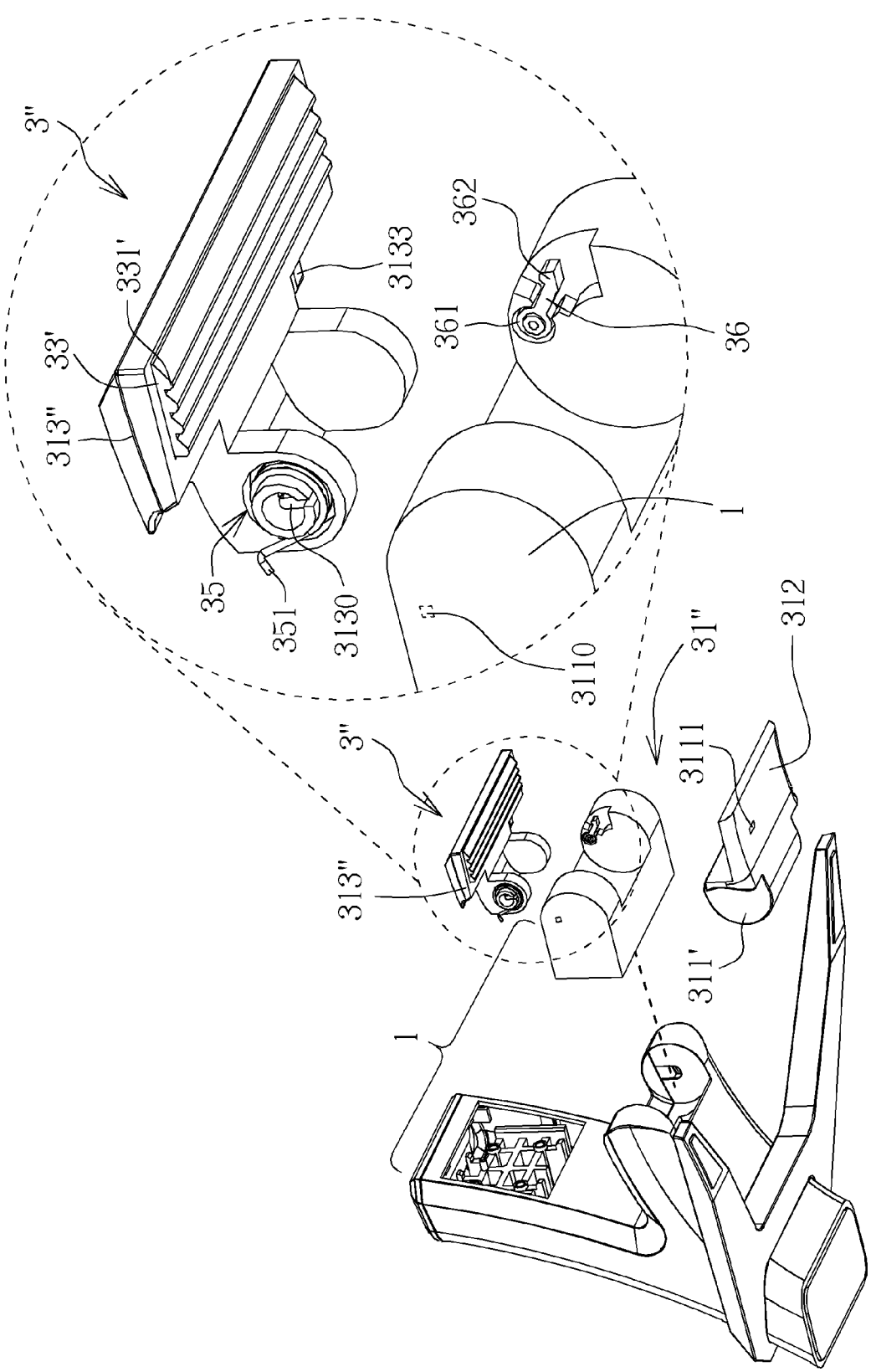
FIG. 10A is an exploded diagram of a mechanism device and the frame according to a third embodiment of the present invention.
Figure 10B:
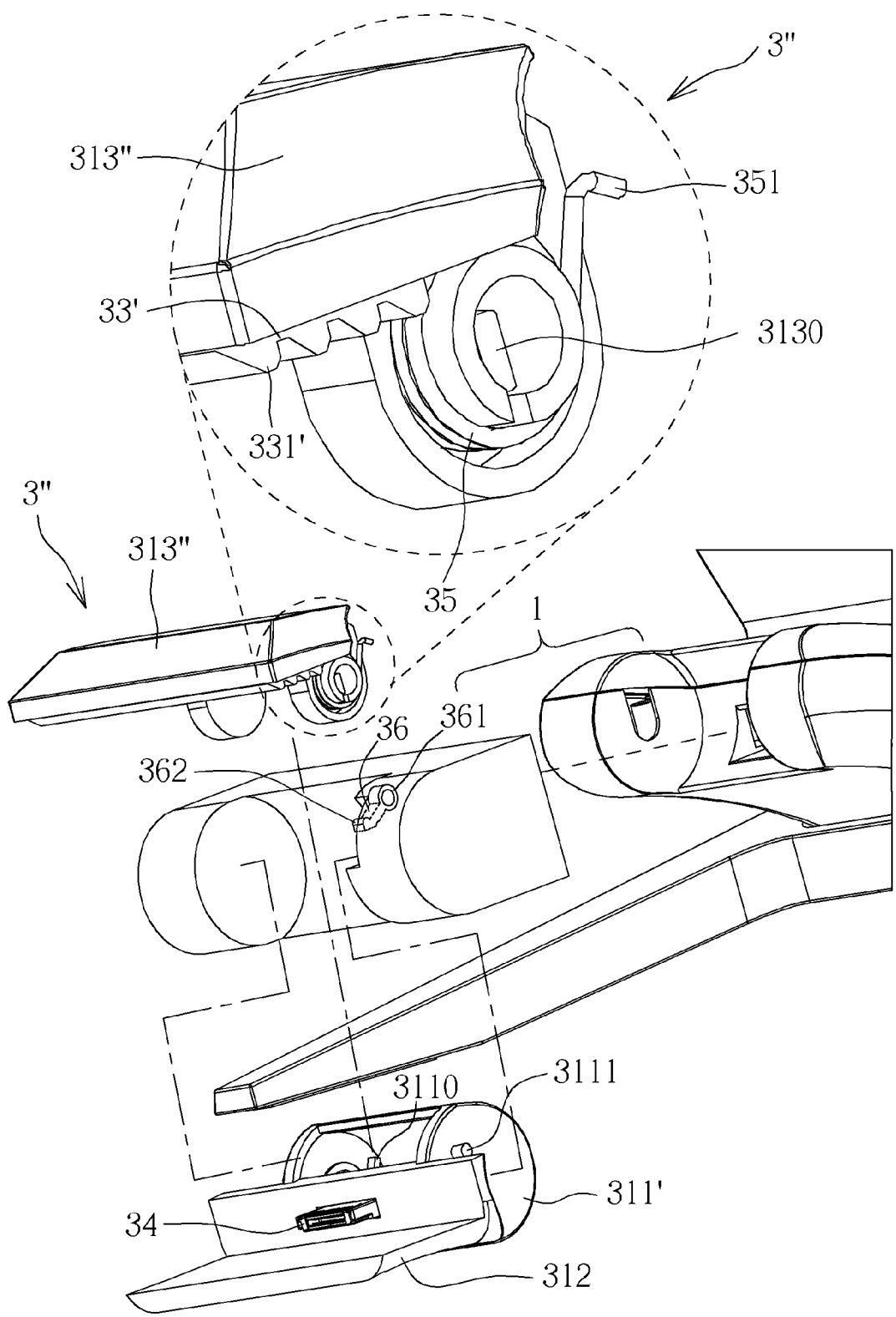
FIG. 10B is a partly exploded diagram of the mechanism device and the frame in another view according to the third embodiment of the present invention.
Figure 10C:
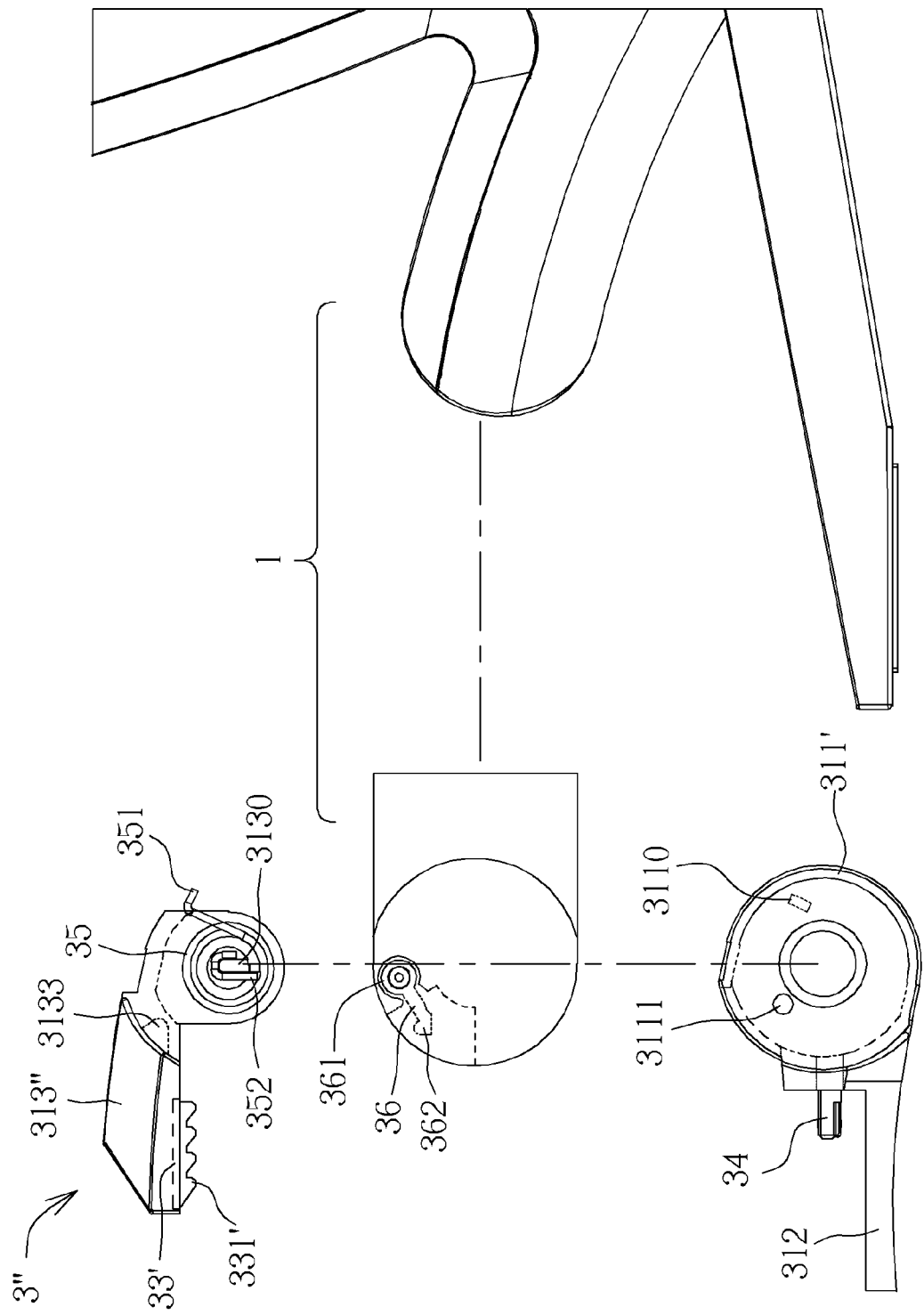
FIG. 10C is a partly exploded perspective diagram of the mechanism device and the frame according to the third embodiment of the present invention.

Please refer to FIG. 10A, FIG. 10B and FIG. 10C. FIG. 10A is an exploded diagram of a mechanism device 3" and the frame 1 according to a third embodiment of the present invention. FIG. 10B is a partly exploded diagram of the mechanism device 3" and the frame 1 in another view according to the third embodiment of the present invention. FIG. 10C is a partly exploded perspective diagram of the mechanism device 3" and the frame 1 according to the third embodiment of the present invention. As shown in FIG. 10A, FIG. 10B and FIG. 10C, the main difference between the mechanism device 3" and the aforesaid mechanism device 3' is that the mechanism device 3" further includes a rotating arm 36 rotably disposed on the frame 1, a main casing 311' of a holding base 31" further has a pushing block 3111, and a second holding casing 313" of the mechanism device 3" further has a pushed structure 3133. In addition, the rotating arm 36 has a pivotal end 361 and an abutting end 362. The pivotal end 361 is pivoted to the frame 1.

Figure 11:
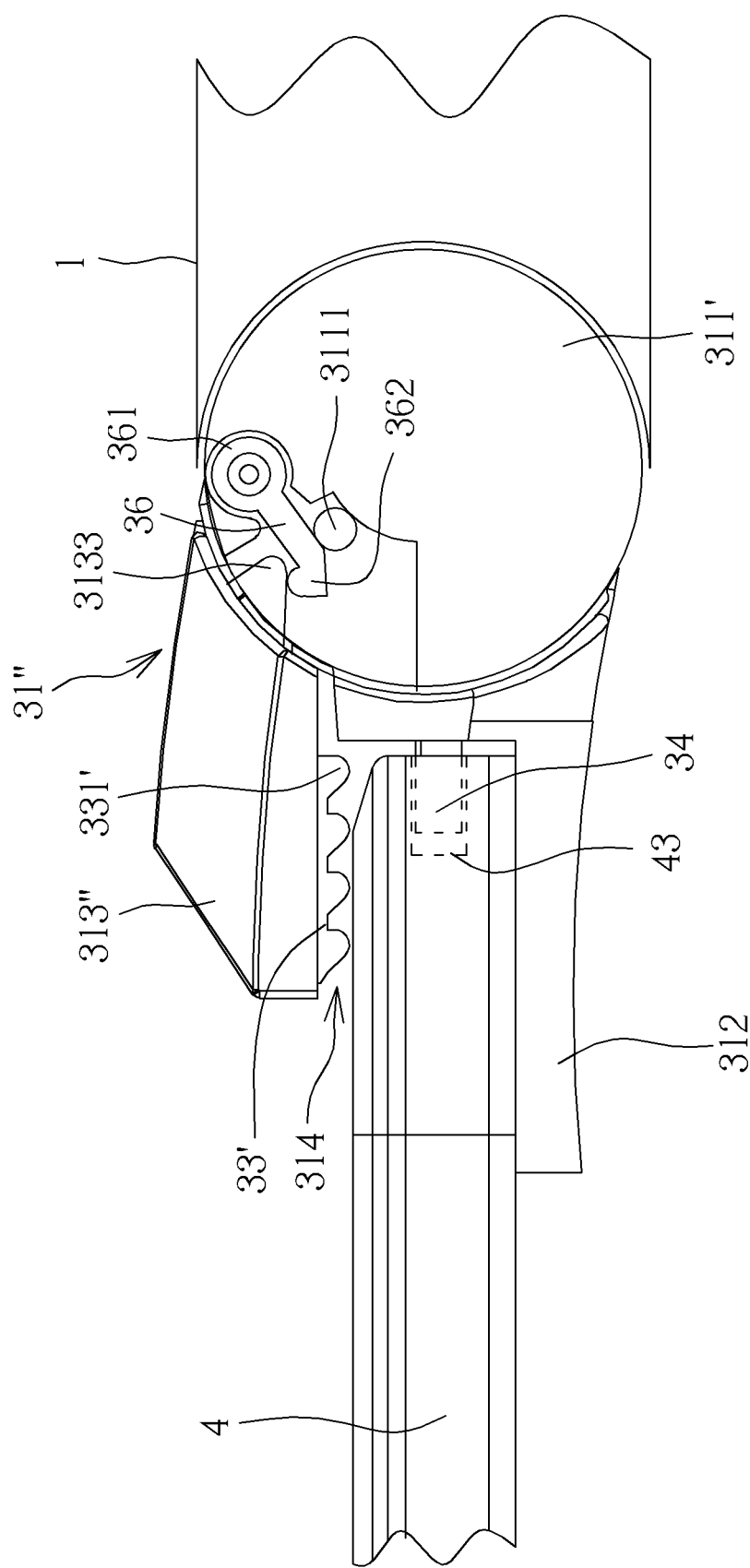
FIG. 11 is a diagram of the frame 1 and the mechanism device in a detaching status according to the third embodiment of the present invention.
Figure 12:
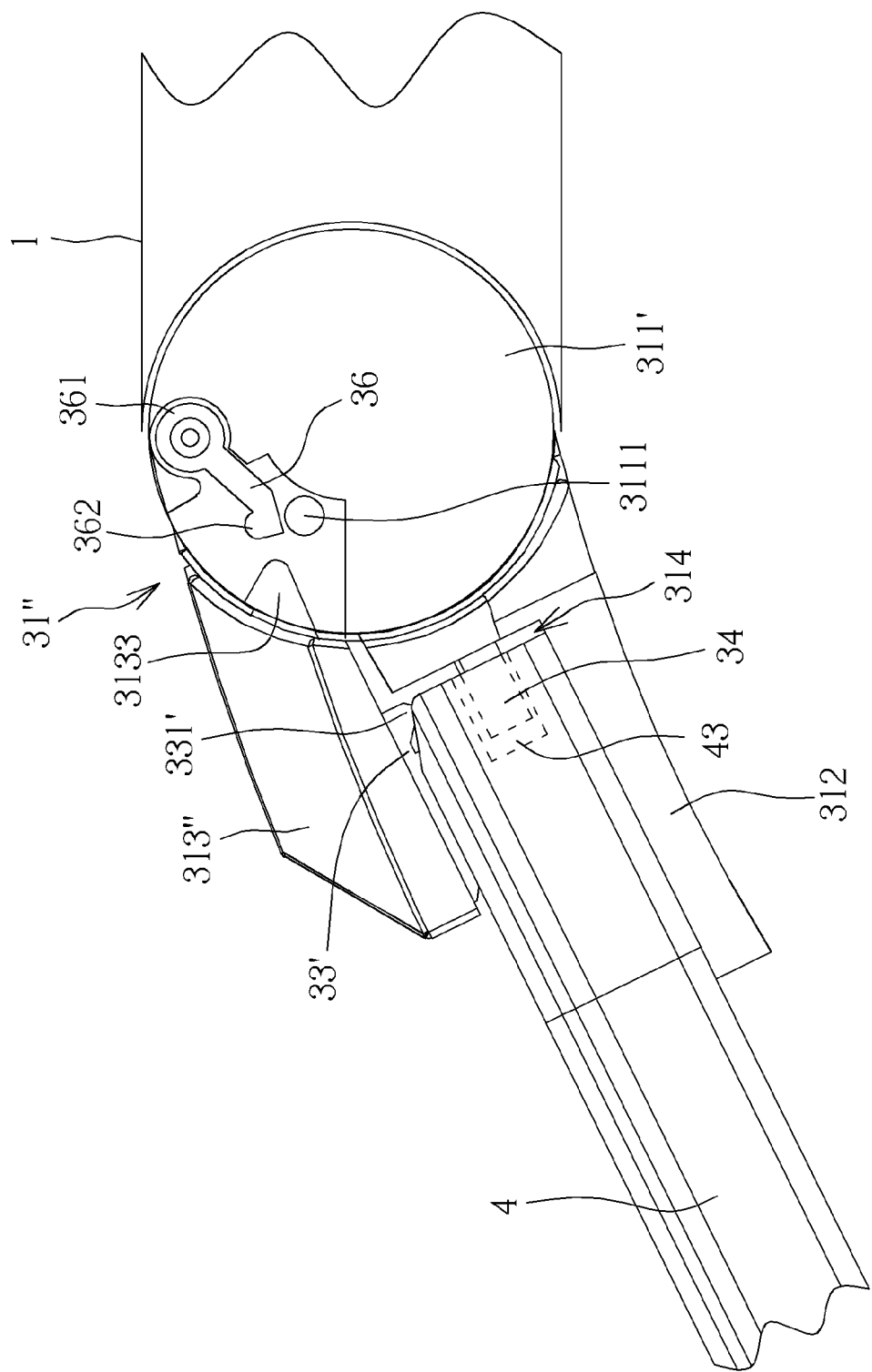
FIG. 12 is a diagram of the frame 1 and the mechanism device in a usage status according to the third embodiment of the present invention.

Please refer to FIG. 11 and FIG. 12. FIG. 11 is a diagram of the frame 1 and the mechanism device 3" in a detaching status according to the third embodiment of the present invention. FIG. 12 is a diagram of the frame 1 and the mechanism device 3" in a usage status according to the third embodiment of the present invention. As shown in FIG. 11 and FIG. 12, during the frame 1 and the mechanism device 3" is rotated from a usage position shown in FIG. 12 to a detaching position shown in FIG. 11, the pushed structure 3133 of the second holding casing 313", the pushed structure 3133 of the second holding casing 313" is moved from a position shown in FIG. 12 to a position where the pushed structure 3133 abuts against the abutting end 362 of the rotating arm 36, and the pushing block 3111 of the main casing 311' is moved from a position shown in FIG. 12 to a position where the pushing block 3111 pushes the rotating arm 36. Accordingly, when the frame 1 and the mechanism device 3" further moves to the detaching position shown in FIG. 11, the pushing block 3111 pushes the rotating arm 36, so as to activate the abutting end 362 to push the pushed structure 3133. In such a manner, the rotating arm 36 is able to drive the second holding casing 313" to rotate away from the first holding casing 312 and toward the detaching position shown in FIG. 11, so as to activate the pad structure (i.e. the fixing member 33') to depart from an upper surface of the electronic device 4. As a result, the second holding casing 313" and the pad structure (i.e. the fixing member 33') is no longer press the upper surface of the electronic device 4, so as to be able to detach the electronic device 4 from the clamping slot 314 on the holding base 31".

On the other hand, during the frame 1 and the mechanism device 3" is rotated from the detaching position shown in FIG. 11 to the usage position shown in FIG. 12, the pushing block 3111 of the main casing 311' departs from the rotating arm 36. Accordingly, the pushing block 3111 is no longer push the rotating arm 36, and thus the rotating arm 36 falls due to attraction by gravity itself. As a result, the abutting end 362 of the rotating arm 36 releases the pushed structure 3133 of the second holding casing 313". In such a manner, the frame 1 and the mechanism device 3" is able to move toward the usage position shown in FIG. 12. Meanwhile, the driving member 35 (as shown in FIG. 10A) of the mechanism device 3" drives the second holding casing 313" to rotate toward the first holding casing 312, such that the second holding casing 313" and the pad structure (i.e. the fixing member 33') presses the upper surface of the electronic device 4, so as to fix the electronic device 4 inside the clamping slot 314 on the holding base 31".

Compared to the prior art, the present invention utilizes the guiding member for properly orienting and guiding the electronic device into the clamping slot on the holding base. In such a manner, the connector of the electronic device is able to be aligned with the connector of the mechanism device properly during the aforesaid process, so as to prevent the connector of the mechanism device and the connector of the electronic device from damage due to improper alignment. Furthermore, when the electronic device is guided into the clamping slot on the holding base, the present invention further utilizes the fixing member to fix the electronic device inside the clamping slot, so as to prevent the electronic device from detaching from the clamping slot. Thus, it further prevents the connectors from improper mating. In addition, since the clamping slot for holding the electronic device has the openings formed on the two sides thereof, the openings on the two sides of the clamping slot do not constrain a width of the electronic device that is held by the clamping slot. In other words, the holding base of the present invention is able to hold electronic devices with different sizes by design of the clamping slot with the openings formed on the two sides thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mechanism device with rotary holder installed on a frame, comprising:
   a hinge mechanism installed on the frame;
   a holding base pivoted to the frame by the hinge mechanism and comprising a main casing, a first holding casing and a second holding casing, the first holding casing and the second holding casing extending from two opposite sides of the main casing along a direction away from the hinge mechanism, such that the main casing, the first holding casing and the second holding casing cooperatively define a clamping slot with openings formed on two sides thereof for holding an electronic device;
   at least one guiding member disposed inside the clamping slot and for guiding the electronic device into the clamping slot;
   at least one fixing member disposed inside the clamping slot, the at least one fixing member sheathing on the at least one guiding member or combined with the second holding casing, the at least one fixing member being for fixing the electronic device inside the clamping slot when the electronic device enters the clamping slot;
   a base fixed on the frame; and
   a rotating member pivoted to the base, the guiding post protruding from the rotating member, the holding base being installed on the rotating member and capable of rotating with the rotating member, wherein the at least one guiding member is a guiding post disposed through the main casing and diving into the clamping slot, the guiding post is for inserting into a guiding hole on the electronic device, and two through holes are formed on the main casing for allowing the guiding post to pass through and dive into the clamping slot.

2. The mechanism device of claim 1, wherein the at least one fixing member is a bushing structure covering the guiding post, and the bushing structure tightly fits a wall surrounding the guiding hole when the guiding post inserts into the guiding hole.

3. The mechanism device of claim 2, wherein the guiding post has a front end and a rear end, the guiding post passes through the main casing along a direction from the rear end toward the front end, the bushing structure has a plurality of engaging protrusions, and a cross section of each of the engaging protrusions gradually increases along a direction from the front end toward the rear end.

4. The mechanism device of claim 3, wherein the engaging protrusion is substantially a triangular structure.

5. The mechanism device of claim 3, wherein the bushing structure is made of rubber material.

6. The mechanism device of claim 1, wherein a length of the guiding member is greater than a width of the second holding casing.

7. The mechanism device of claim 1, further comprising:
a connector disposed inside the clamping slot and coupled to a display unit installed on the frame, the connector being for coupling the electronic device to the display unit.

8. A display device, comprising:
a frame;
a display unit installed on the frame; and
a mechanism device installed on the frame, comprising:
a hinge mechanism installed on the frame;
a holding base pivoted to the frame by the hinge mechanism and comprising a main casing, a first holding casing and a second holding casing, the first holding casing and the second holding casing extending from two opposite sides of the main casing along a direction away from the hinge mechanism, such that the main casing, the first holding casing and the second holding casing cooperatively define a clamping slot with openings formed on two sides thereof for holding an electronic device;
at least one guiding member disposed inside the clamping slot and for guiding the electronic device into the clamping slot;
at least one fixing member disposed inside the clamping slot, the at least one fixing member sheathing on the at least one guiding member or combined with the second holding casing, the at least one fixing member being for fixing the electronic device inside the clamping slot when the electronic device enters the clamping slot;
a driving member having a fixing end and a free end; and
a rotating arm rotably disposed on the frame;
wherein the at least one guiding member is a first magnetic member disposed on the first holding casing, the first magnetic member is for abstracting a second magnetic member of the electronic device, so as to guide the electronic device into the clamping slot, the main casing has a fixing rib, the second holding casing is rotably disposed on the main casing and has an abutting rib, the fixing end abuts against the fixing rib and the free end abuts against the abutting rib, such that the driving member drives the second holding casing to rotate toward the first holding casing;
wherein the rotating arm drives the second holding casing to rotate away from the first holding casing when the holding base rotates to a detaching position; the rotating arm releases the second holding casing when the holding base rotates to a usage position, such that the driving member drives the second holding casing to rotate toward first holding casing.

9. A mechanism device with rotary holder installed on a frame, comprising:
a hinge mechanism installed on the frame;
a holding base pivoted to the frame by the hinge mechanism and comprising a main casing, a first holding casing and a second holding casing, the first holding casing and the second holding casing extending from two opposite sides of the main casing along a direction away from the hinge mechanism, such that the main casing, the first holding casing and the second holding casing cooperatively define a clamping slot with openings formed on two sides thereof for holding an electronic device;
at least one guiding member disposed inside the clamping slot and for guiding the electronic device into the clamping slot; and
at least one fixing member disposed inside the clamping slot, the at least one fixing member sheathing on the at least one guiding member or combined with the second holding casing, the at least one fixing member being for fixing the electronic device inside the clamping slot when the electronic device enters the clamping slot;
wherein the at least one guiding member is a first magnetic member disposed on the first holding casing, and the first magnetic member is for abstracting a second magnetic member of the electronic device, so as to guide the electronic device into the clamping slot;
wherein the at least one fixing member is a pad structure disposed on the second holding casing, and the pad structure presses an upper surface of the electronic device when the first magnetic member guides the electronic device into the clamping slot;
wherein the second holding casing has a front side and a rear side, the rear side is coupled to the main casing, the pad structure has a plurality of engaging protrusions, and a cross section of each of the engaging protrusions gradually increases along a direction from the front side toward the rear side.

10. The mechanism device of claim 9, wherein the engaging protrusion is substantially a triangular structure.

11. A mechanism device with rotary holder installed on a frame, comprising:
a hinge mechanism installed on the frame;
a holding base pivoted to the frame by the hinge mechanism and comprising a main casing, a first holding casing and a second holding casing, the first holding casing and the second holding casing extending from two opposite sides of the main casing along a direction away from the hinge mechanism, such that the main casing, the first holding casing and the second holding casing cooperatively define a clamping slot with openings formed on two sides thereof for holding an electronic device;
at least one guiding member disposed inside the clamping slot and for guiding the electronic device into the clamping slot;
at least one fixing member disposed inside the clamping slot, the at least one fixing member sheathing on the at least one guiding member or combined with the second holding casing, the at least one fixing member being for fixing the electronic device inside the clamping slot when the electronic device enters the clamping slot; and
a driving member with a fixing end and a free end;
wherein the at least one guiding member is a first magnetic member disposed on the first holding casing, and the first magnetic member is for abstracting a second magnetic member of the electronic device, so as to guide the electronic device into the clamping slot;
wherein the at least one fixing member is a pad structure disposed on the second holding casing, and the pad structure presses an upper surface of the electronic device when the first magnetic member guides the electronic device into the clamping slot;

wherein the main casing has a fixing rib, the second holding casing is rotably disposed on the main casing and has an abutting rib, the fixing end abuts against the fixing rib and the free end abuts against the abutting rib, such that the driving member drives the second holding casing to rotate toward the first holding casing, so as to make the pad structure press the upper surface of the electronic device.

12. The mechanism device of claim 11, further comprising:

a rotating arm rotably disposed on the frame, the rotating arm driving the second holding casing to rotate away from the first holding casing when the holding base rotates to a detaching position, so as to activate the pad structure to depart from the upper surface of the electronic device; the rotating arm releasing the second holding casing when the holding base rotates to a usage position, such that the driving member drives the second holding casing to rotate toward first holding casing.

13. The mechanism device of claim 12, wherein the main casing further has a pushing block, the second holding casing further has a pushed structure, the rotating arm has a pivotal end and an abutting end, the pivotal end is for pivoting the frame, when the holding base rotates to the detaching position, the pushed structure moves to where the pushed structure abuts against the abutting end and the pushing block pushes the rotating arm, such that the rotating arm activates the abutting end to push the pushed structure, so as to make the second holding casing to rotate away from the first holding casing; when the holding base rotates to the usage position, the pushing block departs from the rotating arm and the abutting end releases the pushed structure, such that the driving member drives the second holding casing to rotate toward the first holding casing.

* * * * *